US010216373B2

United States Patent
Nakano et al.

(10) Patent No.: US 10,216,373 B2
(45) Date of Patent: Feb. 26, 2019

(54) IMAGE PROCESSING APPARATUS FOR POSITION ADJUSTMENT BETWEEN MULTIPLE FRAMES INCLUDED IN A VIDEO

(71) Applicant: NK Works Co., Ltd., Wakayama-shi, Wakayama (JP)

(72) Inventors: Tomoo Nakano, Wakayama (JP); Yukiko Murata, Wakayama (JP)

(73) Assignee: NORITSU PRECISION CO., LTD., Wakayama-shi (JP)

( * ) Notice: Subject to any disclaimer, the term of this patent is extended or adjusted under 35 U.S.C. 154(b) by 350 days.

(21) Appl. No.: 14/173,534

(22) Filed: Feb. 5, 2014

(65) Prior Publication Data
US 2014/0223305 A1    Aug. 7, 2014

(30) Foreign Application Priority Data
Feb. 5, 2013    (JP) ................................ 2013-020839

(51) Int. Cl.
*H04N 5/232*    (2006.01)
*G06F 3/0484*    (2013.01)

(52) U.S. Cl.
CPC ....... *G06F 3/0484* (2013.01); *H04N 5/23229* (2013.01); *H04N 5/23254* (2013.01); *H04N 5/23277* (2013.01)

(58) Field of Classification Search
CPC .............. G06F 3/0484; G06K 9/00765; H04N 5/23267; H04N 5/147; H04N 5/23229;
(Continued)

(56) References Cited

U.S. PATENT DOCUMENTS 7,739,599 B2 *    6/2010    Patten ................... G11B 27/032
                                                    715/716
8,750,636 B2 *    6/2014    Souchard .................. G06T 7/20
                                                    348/208.13
(Continued)

FOREIGN PATENT DOCUMENTS

JP    2011-156321 A    8/2011

OTHER PUBLICATIONS

Office Action dated Jan. 17, 2017, issued in counterpart Japanese Application No. 2013-020839, with English translation (8 pages).

*Primary Examiner* — Kieu D Vu
*Assistant Examiner* — Blaine T. Basom
(74) *Attorney, Agent, or Firm* — Westerman, Hattori, Daniels & Adrian, LLP

(57) ABSTRACT

The image processing apparatus includes a group creation unit and a group adjustment unit. The group creation unit automatically creates a frame group that includes multiple frames that are a portion of the video and have undergone position adjustment with respect to one another such that the target object images overlap one another. The group adjustment unit receives, from a user, a designation of a group adjustment amount that is a position adjustment amount for the frame group, and performs position adjustment on the frames included in the frame group in accordance with the group adjustment amount. Note that automatically creating the frame group here means that rather than receiving a designation of a position adjustment amount from the user, the image processing apparatus automatically creates a frame group in accordance with a predetermined algorithm.

13 Claims, 14 Drawing Sheets

(58) Field of Classification Search
CPC .............. H04N 5/23254; G11B 27/031; G11B 27/034; G11B 27/34
See application file for complete search history.

(56) References Cited

U.S. PATENT DOCUMENTS

| | | | |
|---|---|---|---|
| 2003/0086596 A1* | 5/2003 | Hipp | G06T 7/0012 382/128 |
| 2004/0085340 A1* | 5/2004 | Dimitrova | G11B 27/031 715/723 |
| 2004/0091175 A1* | 5/2004 | Beyrouti | G06F 17/3028 382/305 |
| 2006/0132503 A1* | 6/2006 | Makela | G11B 27/031 345/629 |
| 2009/0153648 A1* | 6/2009 | Quennesson | G11B 27/034 348/43 |
| 2011/0057948 A1* | 3/2011 | Witt | G06T 1/00 345/593 |
| 2012/0050332 A1* | 3/2012 | Nikara | G06F 3/0481 345/660 |
| 2012/0093361 A1* | 4/2012 | Huang | G06T 7/208 382/103 |
| 2013/0055087 A1* | 2/2013 | Flint | G11B 27/034 715/723 |
| 2013/0107066 A1* | 5/2013 | Venkatraman | H04N 5/23248 348/208.4 |
| 2014/0198178 A1* | 7/2014 | Ioffe | H04N 5/247 348/43 |
| 2014/0199043 A1* | 7/2014 | Guntur | H04N 21/4728 386/230 |
| 2015/0154754 A1* | 6/2015 | Teittinen | G06T 7/0024 345/634 |

* cited by examiner

IMAGE PROCESSING APPARATUS FOR POSITION ADJUSTMENT BETWEEN MULTIPLE FRAMES INCLUDED IN A VIDEO

FIELD OF INVENTION

The present invention relates to an image processing apparatus and a computer-readable medium storing an image processing program.

BACKGROUND

Conventionally, many image processing techniques for performing position adjustment between multiple images such that specific target object images overlap have been proposed and used in various applications. These applications are typically comparison, sharpening and the like of images, but Patent Literature 1 (JP 2011-156321A) discloses yet another application. Patent Literature 1 discloses a technique for allowing a technician to accurately determine the relative positions of a wire and a blood vessel while viewing an X-ray video of a wire that has been inserted into the body of a patient. Specifically, a technique is disclosed in which position adjustment is performed between multiple frames included in the X-ray video such that the images of the wire overlap in order to remove the influence of motion in the wire images caused by the heartbeat, breathing, body movements, and the like of the patient. Also, in Patent Literature 1, as a first step for performing this kind of position adjustment, the wire images are automatically extracted from the frames included in the video.

If a wire in a body is to be photographed by X-ray, it may possibly be relatively easy to automatically extract the target object images from the frames. This is because in addition to having a unique shape inside a body, a wire absorbs more X-rays than the body of a patient that is captured in the background, and it is rendered relatively clearly. However, the accuracy of the automatic extraction of the target object images can greatly decrease depending on shooting conditions such as the type of target object and the shooting location. Furthermore, the accuracy can also decrease in the case where the shape or size of the target object image changes greatly during shooting. Accordingly, with the technique in Patent Literature 1, due to a decrease in the accuracy of the automatic extraction of the target object images, the accuracy of the position adjustment between frames included in the video may also decrease.

SUMMARY of INVENTION

An object of the present invention is to provide an image processing apparatus and a computer-readable medium storing an image processing program that make it possible for position adjustment between multiple frames included in a video to be performed accurately with simple operations using the judgment of a user.

An image processing apparatus according to a first aspect of the present invention is an image processing apparatus for performing position adjustment between multiple frames included in a video such that images of a target object captured in the video overlap one another, and includes a group creation unit and a group adjustment unit. The group creation unit automatically creates a frame group that includes multiple frames that are a portion of the video and have undergone position adjustment with respect to one another such that the target object images overlap one another. The group adjustment unit receives, from a user, a designation of a group adjustment amount that is a position adjustment amount for the frame group, and performs position adjustment on the frames included in the frame group in accordance with the group adjustment amount. Note that automatically creating the frame group here means that rather than receiving a designation of a position adjustment amount from the user, the image processing apparatus automatically creates a frame group in accordance with a predetermined algorithm.

Here, rather than receiving a designation of a position adjustment amount from a user, the frame group is first automatically created. The frame group is a group whose elements are multiple frames that have undergone position adjustment with respect to one another such that the images of the target object of interest overlap. Next, a designation of a position adjustment amount is received from the user, and position adjustment is performed on the frames included in the frame group all at once.

Accordingly, the user can manually perform position adjustment on frames that were automatically included in a certain frame group with respect to a frame that was not automatically included in that frame group. In other words, the limitations of the automatic position adjustment can be compensated for with a manual operation performed by the user. Furthermore, at this time, the user can designate the position adjustment amount for the frame group, and therefore the user need only perform a small number of operations. Accordingly, here, the user can use his or her judgment to accurately perform position adjustment between multiple frames included in a video with a simple operation.

An image processing apparatus according to a second aspect of the present invention is the image processing apparatus according to the first aspect, furthermore including an individual adjustment unit. The individual adjustment unit receives, from the user, a designation of an individual adjustment amount that is a position adjustment amount for a specific frame included in the video, and performs individual position adjustment on the specific frame in accordance with the individual adjustment amount. Note that the "specific frame" mentioned here may be a frame belonging to a frame group, and it may be an ungrouped frame.

Here, the user can designate a position adjustment amount not only for one frame group at a time, but also for one frame at a time. Accordingly, the user can adjust the position of a problematic frame individually in the case where the user feels that the result of the position adjustment that was performed automatically is strange, in the case where there is a frame that has not been included in any frame group and has not undergone position adjustment, or the like. Accordingly, position adjustment between frames included in a video can be performed more accurately.

An image processing apparatus according to a third aspect of the present invention is the image processing apparatus according to the first aspect or the second aspect, where the group adjustment unit displays a composite image of a comparison frame included in the video and a representative frame included in the frame group, such that the user can reference the composite image when the group adjustment amount is to be designated. Note that the "comparison frame" may be a frame belonging to the same frame group as the representative frame, it may be a frame belonging to a different frame group, and it may be a frame belonging to no frame group.

Here, during group position adjustment, the user is presented with a composite image of the representative frame of the frame group and the frame that is to be compared with the representative frame (the comparison frame). Here, the composite image is, for example, an average image of both frames in which the representative frame is made translucent and overlaid on the comparison frame, a difference image showing only the differences between the representative frame and the comparison frame, or the like. Accordingly, here, the user can intuitively understand the amount of shift in the position of the representative frame with respect to the comparison frame and can easily designate the position adjustment amount of the frame group.

An image processing apparatus according to a fourth aspect of the present invention is the image processing apparatus according to any of the first to third aspects, where the group adjustment unit allows the user to designate a reference frame included in the video in association with the frame group, and when the reference frame undergoes position adjustment by a specified position adjustment amount, automatically performs position adjustment on the frames included in the frame group by the specified position adjustment amount.

Here, the user can designate the reference frame for a frame group. Then, when the reference frame undergoes position adjustment, the frames included in the frame group automatically undergo position adjustment accordingly. This function helps in maintaining the positional relationship between the reference frame and the frame group. For example, in the case where the frame that is designated as the reference frame for a certain frame group is a frame included in another frame group, the positional relationship between both frame groups can be maintained even if the entirety of the latter frame group undergoes position adjustment.

An image processing apparatus according to a fifth aspect of the present invention is the image processing apparatus according to any of the first to fourth aspects, where the group creation unit allows the user to designate an area in which the target object is present in a specific frame included in the video, detects a feature point in the designated area, detects, in the entirety or a portion of the video, a frame having a feature point that is the same as or similar to the detected feature point, and associates the specific frame and the detected frame as belonging to the same frame group.

Here, when a frame group is to be created, the user can designate an area in which the target object of interest is present in a specific frame. Then, frames that are to be included in the same frame group as the specific frame are determined using the feature point in the area as a reference. Accordingly, frame groups can be created using various target objects as references.

An image processing apparatus according to a sixth aspect of the present invention is the image processing apparatus according to any of the first to fifth aspects, furthermore including a display control unit. The display control unit sequentially plays back the frames included in the video that are the result of the position adjustment. Accordingly, here, the frames resulting from position adjustment can be played back as a video.

An image processing apparatus according to a seventh aspect of the present invention is the image processing apparatus according to any of the first to sixth aspects, where the position adjustment includes performing at least one of translation, rotation, enlargement, reduction, and distortion of the frame.

A non-transitory computer-readable medium according to an eighth aspect of the present invention stores an image processing program. The image processing program is an image processing program for performing position adjustment between multiple frames included in a video such that images of a target object captured in the video overlap one another and causes a computer to execute a step of automatically creating a frame group that includes a plurality of frames that are a portion of the video and have undergone position adjustment with respect to one another such that the target object images overlap one another, and a step of receiving, from a user, a designation of a group adjustment amount that is a position adjustment amount for the frame group, and performing position adjustment on the frames included in the frame group in accordance with the group adjustment amount. Note that automatically creating the frame group here means that rather than receiving a designation of a position adjustment amount from the user, the computer automatically creates a frame group in accordance with a predetermined algorithm. Here, an effect similar to that of the first aspect can be demonstrated.

According to the present invention, rather than receiving a designation of a position adjustment amount from a user, a frame group is first automatically created. Next, a designation of a position adjustment amount is received from the user, and position adjustment is performed on the frames included in the frame group all at once. Accordingly, the user can manually perform position adjustment on a frame that was automatically included in a certain frame group with respect to a frame that was not automatically included in that frame group. That is to say, the limitations of the automatic position adjustment can be compensated for with a manual operation performed by the user. Furthermore, at this time, the user can designate the position adjustment amount for the frame group, and therefore the user need only perform a small number of operations. Accordingly, here, the user can use his or her judgment to accurately perform position adjustment between multiple frames included in a video with a simple operation.

DETAILED DESCRIPTION OF THE PREFERRED EMBODIMENTS

Hereinafter, an image processing apparatus and a computer-readable medium storing an image processing program according to an embodiment of the present invention will be described with reference to the drawings.

1. Overview of Image Processing Apparatus

Figure 1:
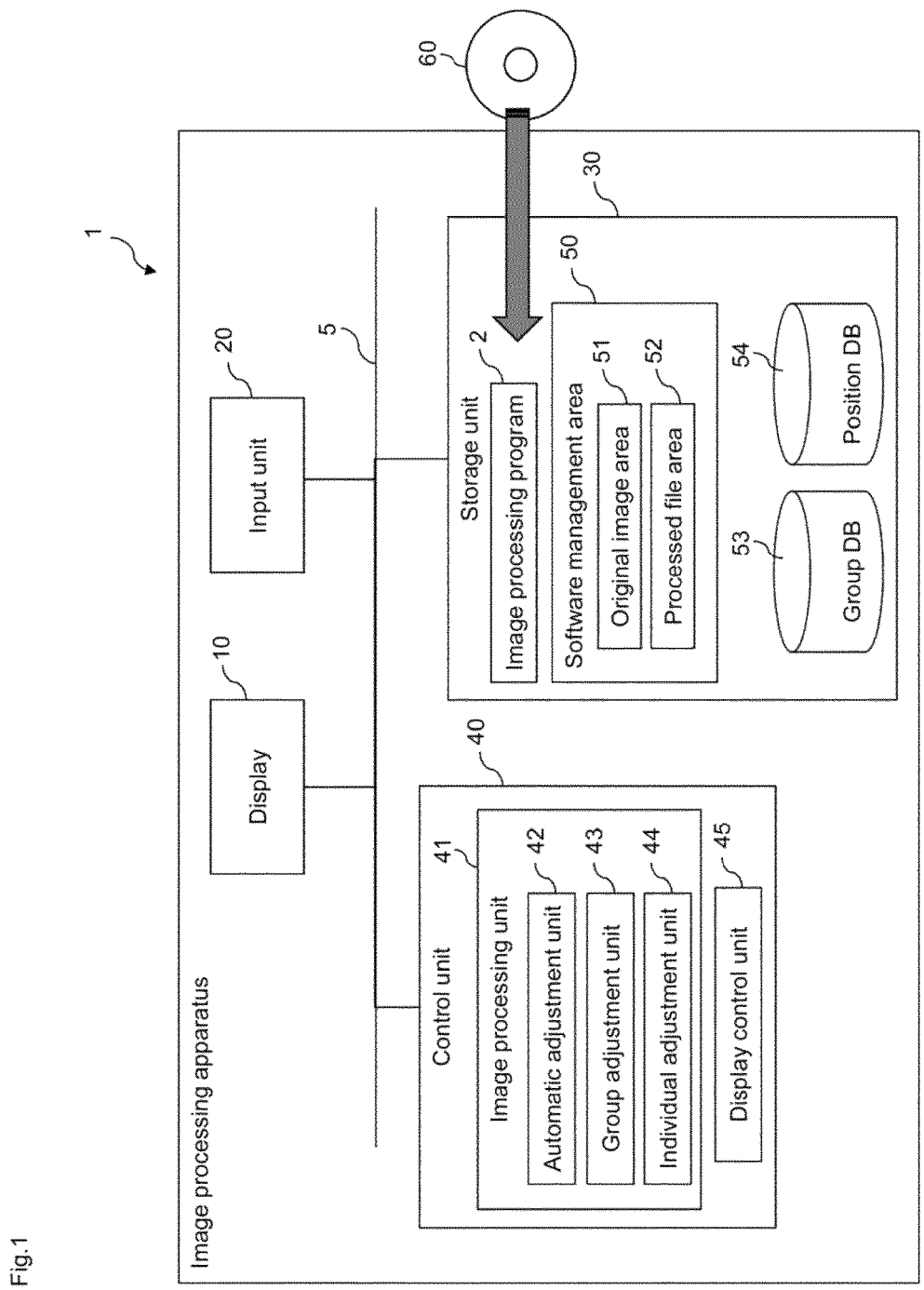
FIG. 1 is a block diagram of an image processing apparatus according to an embodiment of the present invention.

An image processing apparatus 1 shown in FIG. 1 is one embodiment of an image processing apparatus according to the present invention. The image processing apparatus 1 is a general-purpose personal computer. An image processing program 2 that is one embodiment of an image processing program according to the present invention is provided and installed in the image processing apparatus 1 via, for example, a computer-readable recording medium 60 such as a CD-ROM, a DVD-ROM and an USB memory that stores the image processing program 2. The image processing program 2 is application software for supporting image processing performed on moving images and still images. The image processing program 2 causes the image processing apparatus 1 to execute steps included in operations that will be described later.

The image processing apparatus 1 has a display 10, an input unit 20, a storage unit 30, and a control unit 40. The display 10, the input unit 20, the storage unit 30, and the control unit 40 can appropriately communicate with each other due to being connected to each other via a bus line or cable 5, for example. In the present embodiment, the display 10 is configured by a liquid crystal display or the like and displays later-described screens and the like to a user. The input unit 20 is configured by a mouse and a keyboard, or the like and receives user's operations to the image processing apparatus 1. The storage unit 30 is a non-volatile storage area configured by hard disk or the like. The control unit 40 is configured by a CPU, a ROM and a RAM, or the like.

The image processing program 2 is stored in the storage unit 30. A software management area 50 is secured in the storage unit 30. The software management area 50 is an area used by the image processing program 2. An original image area 51 and a processed file area 52 are secured in the software management area 50. The roles of these areas 51 and 52 will be described later.

The control unit 40 operates in a virtual manner as an image processing unit 41 and a display control unit 45, by reading out and executing the image processing program 2 stored in the storage unit 30. More specifically, the image processing unit 41 operates as an automatic adjustment unit 42, a group adjustment unit 43, and an individual adjustment unit 44, when position adjustment processing (described later) is performed. The operations of the units 41 to 45 will be described later.

Figure 2:
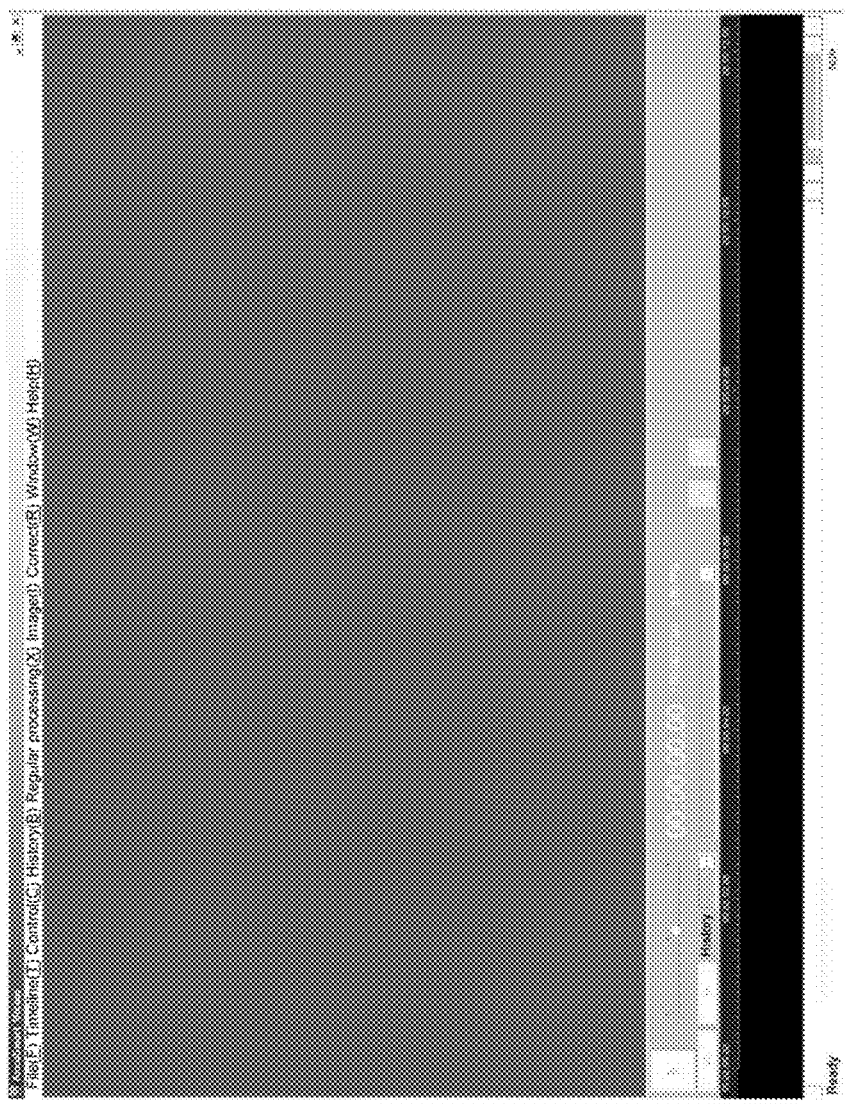
FIG. 2 is a diagram showing a basic screen before image data is received.

2. Detailed Description of Configuration and Operations of Image Processing Apparatus The control unit 40 starts the image processing program 2 upon detecting that the user has performed a predetermined operation via the input unit 20. When the image processing program 2 has been started, a basic screen W1 (see FIG. 2) is displayed on the display 10. Note that the display control unit 45 controls the display of screens, windows, buttons and all other elements that are displayed on the display 10.

2-1. Import of Image Data

The basic screen W1 receives an instruction to import image data to the original image area 51 from a user. Image data imported to the original image area 51 is targeted for later-described playback processing and image processing. The control unit 40 imports image data to the original image area 51 from a still image file or a moving image file. Note that in this specification, still image files are data files in a still image format, and moving image files are data files in a moving image format.

In the case of importing image data from a still image file, the user designates one still image file or one folder by operating the input unit 20. In the case of the former, the control unit 40 prompts the user to input a filename and an address path in the storage unit 30 for that still image file. In the case of the latter, the control unit 40 prompts the user to input a folder name and an address path in the storage unit 30 for that folder. Thereafter, the control unit 40 saves the designated still image file or all the still image files in the designated folder as a group of still image files in the original image area 51. Note that the term "group" used in this specification is not limited to being made up of multiple elements, and may be made up of one element.

On the other hand, in the case of importing image data from a moving image file, the user inputs a filename and an address path in the storage unit 30 for one moving image file by operating the input unit 20. The display control unit 45 displays a moving image import window (not shown) in a superimposed manner on the basic screen W1 upon detecting that the user designated a moving image file. The moving image import window receives the selection of a segment of arbitrary length from the user, out of the entire segment of the timeline of the designated moving image file. Upon detecting that the user selected a specific segment via the input unit 20, the control unit 40 generates a group of still image files that corresponds on a one-to-one basis to the group of frames included in that segment of the designated moving image file. Thereafter, the control unit 40 saves this group of still image files in the original image area 51. Accordingly, in the present embodiment, the image data targeted for later-described playback processing and image processing is not a moving image file, but rather still image files.

Note that even if a group of still image files imported to the original image area 51 originates from still image files rather than from a moving image file, the control unit 40 recognizes the still image files included in the group as being still image files that are arranged in a timeline. The arrangement is automatically determined based on file attributes (filename, created on date/time, updated on date/time, or the like).

2-2. Playback Processing with Respect to a Group of Still Image Files

When a group of still image files is imported to the original image area 51, the display control unit 45 displays a display window W2 (see FIG. 3) in a superimposed manner on the basic screen W1. The number of display windows W2 that are created is the same as the number of timelines of the groups of still image files that were imported to the original image area 51.

First, one still image file included in the group of still image files imported to the original image area 51 (e.g., the still image file corresponding to the first frame on the timeline) is displayed in the display window W2. Thereafter, the frame that is displayed in the display window W2 is switched upon receiving a user operation, as will be described later.

Figure 3:
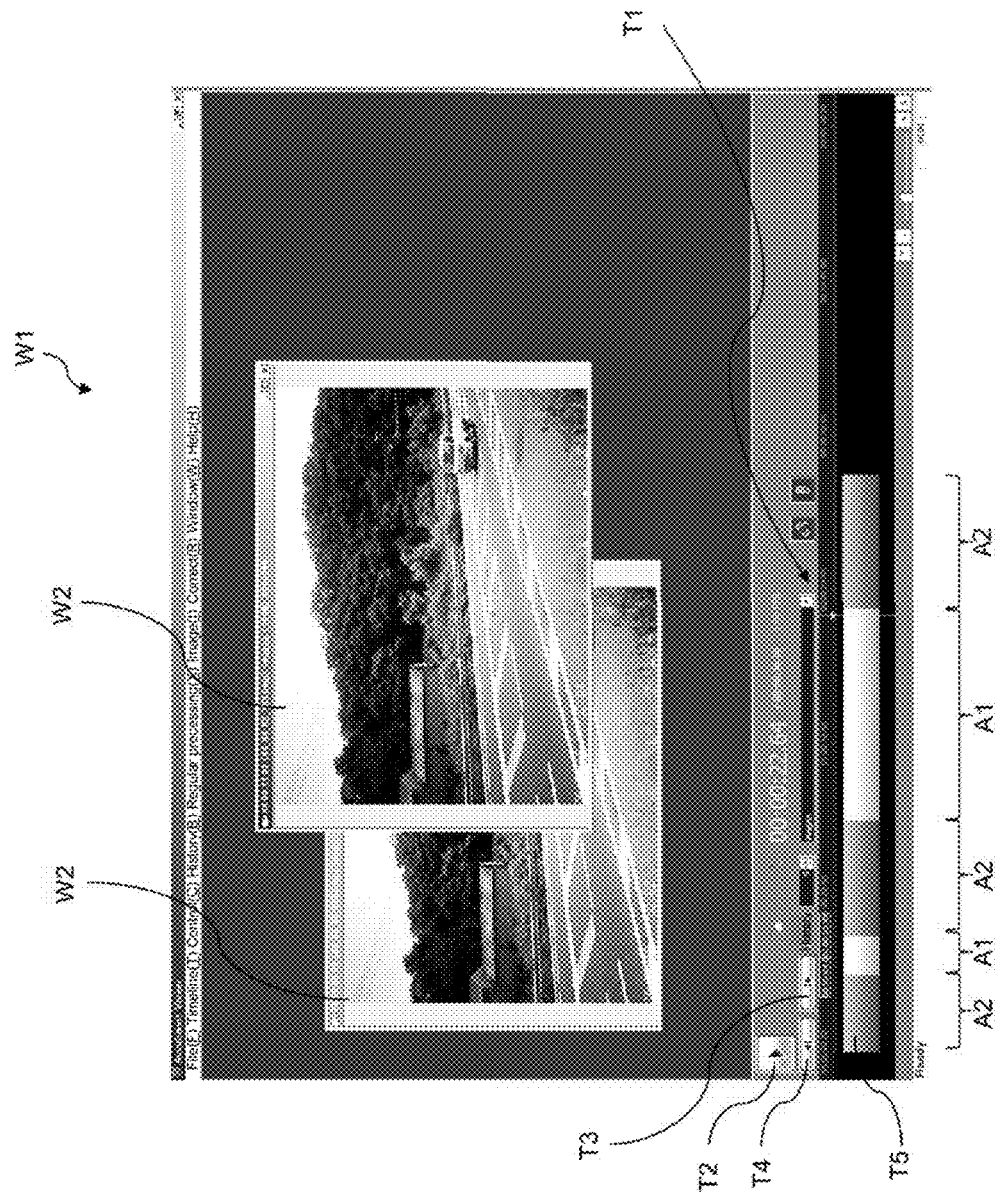
FIG. 3 is a diagram showing a basic screen after image data has been received.

The group of frames that belong to the timeline corresponding to the display window W2 can be played back as a moving image in that display window W2 by the display control unit 45. Here, as shown in FIG. 3, a window selection pull-down menu T1, a play button T2, a frame advance button T3, a frame reverse button T4, and a timeline bar T5 are arranged on the basic screen W1.

Even if there are multiple display windows W2, there is only one active display window W2. The window selection pull-down menu T1 receives a user selection of which display window W2 is to be made active. Hereinafter, the timeline that corresponds to the active display window W2 is referred to as the active timeline, and frame group that belongs to the active timeline is referred to as the active frame group. Also, the frame currently displayed in the active display window W2 is referred to as the active display frame.

The play button T2 receives a user instruction to play back the active frame group as a moving image. Upon detecting that the user has pressed the play button T2 via the input unit 20, the display control unit 45 displays the frames included in the active frame group sequentially along the timeline in the active display window W2 in a frame advance format. Note that playback starts from the active display frame at the point in time when the play button T2 is pressed. Also, the play button T2 receives a user instruction to stop playback. Upon detecting that the user has pressed the play button T2 via the input unit 20 during playback, the display control unit 45 fixes the display in the active display window W2 to the active display frame at that point in time.

The frame advance button T3 and the frame reverse button T4 respectively receive user instructions to switch the active display frame to the next frame and the previous frame along the active timeline.

The timeline bar T5 is an object that diagrammatically represents the active timeline. The timeline bar T5 is equally divided in the direction in which the bar extends, the number of the divided areas being the same as the number of frames included in the active frame group. An n-th divided area from the left on the timeline bar T5 corresponds to the n-th frame on the active timeline (where n is a natural number).

As shown in FIG. 3, divided areas A1 corresponding to a selected frame group and divided areas A2 corresponding to a non-selected frame group are displayed in a different manner in the timeline bar T5. The selected frame group is the frame group that corresponds to the segment that is currently selected on the active timeline. The non-selected frame group is the frame group that corresponds to the segment that is not currently selected on the active timeline.

The timeline bar T5 receives a user selection of an arbitrary segment on the active timeline. In other words, by operating divided areas on the timeline bar T5 via the input unit 20, the user can select an arbitrary number of frames in the active frame group. The image processing unit 41 recognizes the selected frame group as being the target of later-described image processing. Note that each time a divided area on the timeline bar T5 is selected by the user, the active display frame is switched to the frame that corresponds to the most recently selected partitioned area.

2-3. Image Processing

Hereinafter, image processing with respect to a selected frame group will be described. The image processing unit 41 can execute multiple image processing modules such as noise removal, sharpness, brightness/contrast/chroma adjustment, image resolution adjustment, rotation, and the addition of characters/arrows/mosaic, image averaging and position adjustment processing. The image processing modules are incorporated in the image processing program 2.

By operating the basic screen W1 via the input unit 20, the user can select any of the image processing modules any number of times in any order. Each time the image processing unit 41 detects that the user selected an image processing module, it executes that image processing module on the selected frame group.

As image processing modules are executed on a frame sequentially, that is, once, twice, thrice, and so on, that frame is sequentially manipulated into a first-order frame, a second-order frame, a third-order frame, and so on. A 0th-order frame corresponds to a still image file saved in the original image area 51. An (m+1)th-order frame corresponds to a still image file obtained after an image processing module has been executed once on a still image file corresponding to an mth-order frame (where m is an integer greater than or equal to 0). The image processing unit 41 sequentially generates still image files that correspond to the first-order and subsequent frames, and saves those still image files individually in the processed file area 52.

Figure 4:
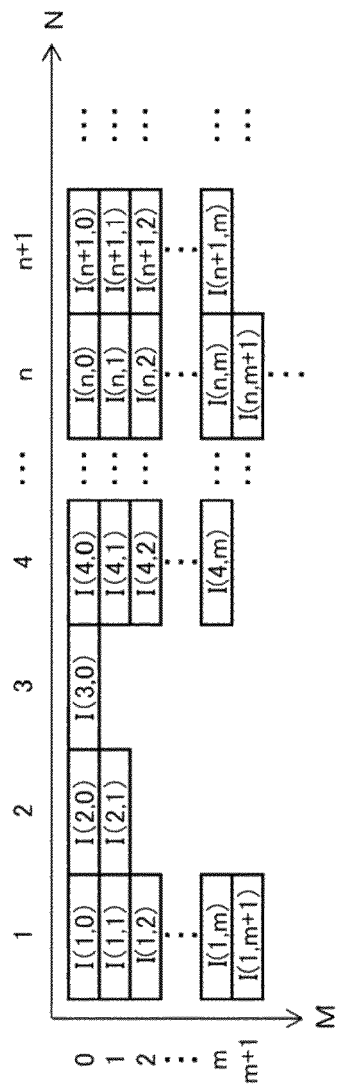
FIG. 4 is a diagram showing a group of still images belonging to one timeline.

FIG. 4 is a conceptual diagram showing how a group of still images belonging to one timeline is managed by the image processing program 2. In FIG. 4, an N axis, which is the horizontal axis, represents the order of the frames on the timeline, and an M axis, which is the vertical axis, represents the order of processing. The box corresponding to the coordinates (n,m) in an N-M space in FIG. 4 represents the still image I (n,m). The still image I (n,m) is the m-order still image of the n-th frame on the timeline (where n is a natural number, and m is an integer greater than or equal to 0).

For each frame, the control unit 40 manages the value of the currently selected coordinate m as a parameter $m_s$. Immediately after a group of still image files has been imported to the original image area 51, the coordinate $m_s$ takes an initial value 0. Thereafter, every time the image processing module is executed, the coordinate $m_s$ of the frame is incremented by 1. Also, the user is able to freely change the coordinate $m_s$ of the selected frame group by performing a predetermined operation via the input unit 20. Note that executing an image processing module on a frame refers to executing the image processing module on an $m_s$-order still image of the frame. Accordingly, changing the coordinate $m_s$ effectively means changing the execution target of the image processing module. Incidentally, displaying a frame refers to displaying a still image of the coordinate $m_s$ of the frame. Accordingly, changing the coordinate $m_s$ also effectively means changing the target to be displayed on the active display window W2.

2-3-1. Position Adjustment Processing

Position adjustment processing, which is one type of image processing implemented by the image processing program 2, will be described below. Position adjustment processing is processing for performing position adjustment between frames included in a video such that the target object images captured in the video overlap. The present invention is realized by three phases, namely automatic adjustment, group adjustment, and individual adjustment being combined by the user as appropriate.

Automatic adjustment is a phase in which without receiving a designation of a specific position adjustment amount from the user, an automatic adjustment unit 42 automatically adjusts the respective positions of frames corresponding to the entirety or part of a selected frame group in accordance with a predetermined algorithm. Note that the "position adjustment amount" is, in a narrow sense, a parameter indicating the frame movement amount, and in a broader sense, it also includes parameters indicating the frame deformation amount. In addition to a translation amount (in units of pixels) in X axis and Y axis directions and a rotation amount) (°) around a Z axis, which indicate the frame movement amount, the position adjustment amount in the present embodiment also includes an enlargement and a reduction amount (%) in the X axis and Y axis directions, which indicate the frame deformation amount. Here, the X axis and Y axis are the horizontal axis and the vertical axis respectively on the frame screen, and the Z axis is the direction that passes through the intersection of the X axis and Y axis and is orthogonal to the frame screen. The position adjustment here is performed between multiple frames such that the target object images overlap. Also, the automatic adjustment creates a frame group including multiple frames whose positions have been adjusted with respect to one another.

The group adjustment is a phase realized by the group adjustment unit 43, in which the designation of a specific position adjustment amount is received from the user and the frames included in the frame group that was created as a result of the automatic adjustment undergo position adjustment all at once. Here, at the time when the frame group is created by the automatic adjustment, all of the frames belonging to the frame group have undergone position adjustment with respect to one another. Accordingly, at the time of group adjustment thereafter, all of the frames uniformly undergo position adjustment such that the relative positions between the frames that have already undergone position adjustment are maintained.

Individual adjustment is a phase realized by the individual adjustment unit 44, in which a designation of a specific position adjustment amount is received from the user and arbitrary frames included in the selected frame group undergo position adjustment individually. The individual adjustment enables the user to adjust the position of problematic frames individually in the case where the user feels that the automatic adjustment result is strange, in the case where there is a frame that is not included in any frame group and has not undergone position adjustment, or the like. Accordingly, individual adjustment is used for fine adjustment subsequent to the automatic adjustment, position adjustment of a frame that was skipped in the automatic adjustment, and the like.

That is to say, group adjustment and individual adjustment are processes for manually performing forced position adjustment on frames that did not undergo position adjustment with respect to other frames in the automatic adjustment, group adjustment being performed one group at a time, and individual adjustment being performed one frame at a time.

Upon detecting that the user has performed a predetermined operation via the input unit 20, the image processing unit 41 causes the position adjustment processing to start. When the position adjustment processing is started, the display unit 45 first causes a position adjustment window W3 (see FIG. 5) to be displayed in an overlapping manner on the basic screen W1. Note that the target of the position adjustment processing is, as described above, the selected frame group at the time when the start of the processing is instructed, and multiple frames are needed in the execution of this processing. Accordingly, in a state where only one frame has been selected as the selected frame group, the operation button and the like for starting the position adjustment processing are disabled and the processing cannot be started. Alternatively, in a state where only one frame has been selected as the selected frame group, all frames on the active timeline can be used as the targets of the position adjustment processing under the condition that multiple frames are present on the active timeline.

Figure 5:
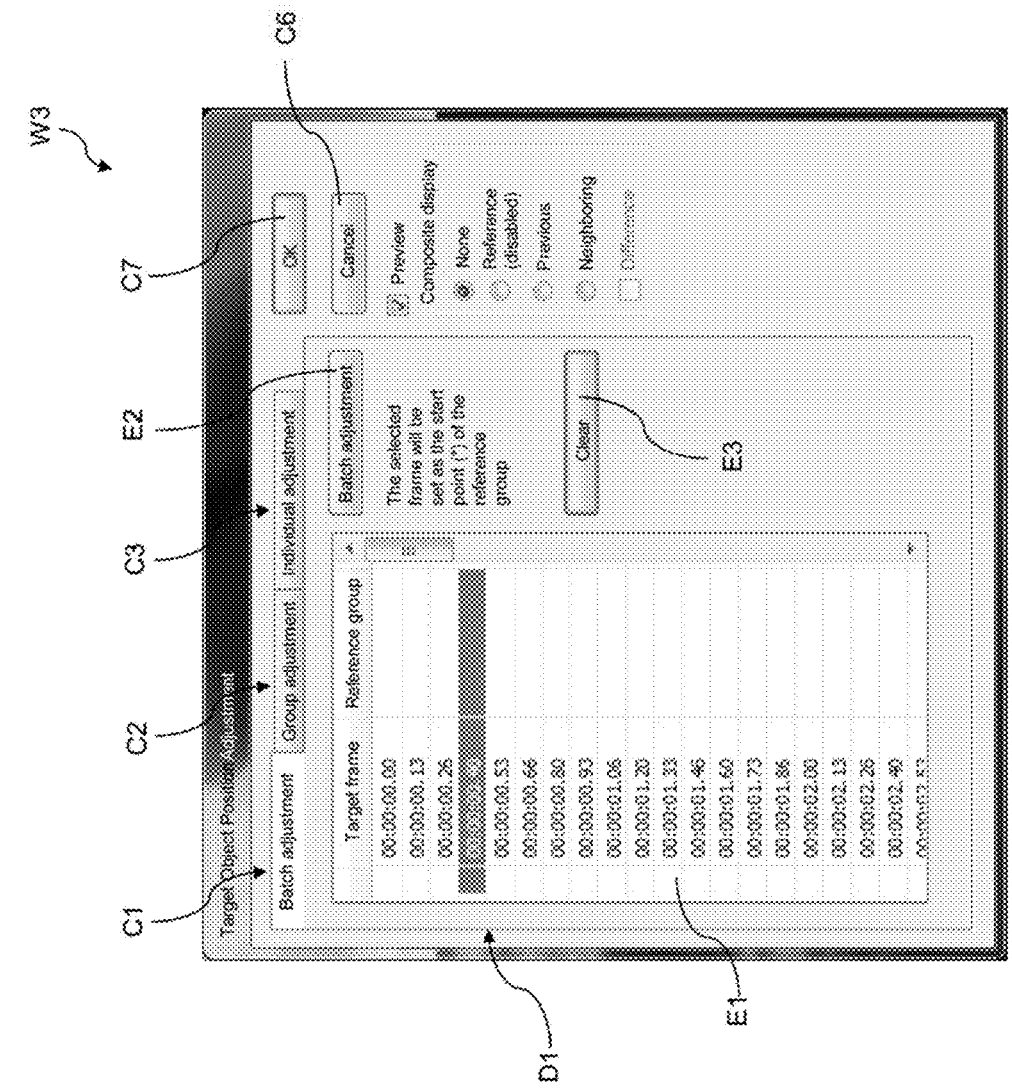
FIG. 5 is a diagram of a position adjustment window in a state where a tab for automatic adjustment has been selected.

As shown in FIG. 5, three selectable tabs C1 to C3 are always arranged in the position adjustment window W3. Upon detecting that the user has selected one of the tabs C1 to C3, the display control unit 45 causes the corresponding one of tab screens D1 to D3 (see FIG. 5, FIG. 11, FIG. 14, and the like) to be displayed in the position adjustment window W3. The tab screens D1 to D3 are screens for automatic adjustment (indicated as "batch adjustment" on tab C1), group adjustment, and individual adjustment respectively. Automatic adjustment, group adjustment, and individual adjustment will be described in detail below.

2-3-1-1. Automatic Adjustment

A table E1, a batch adjustment button E2, and a clear button E3 are arranged in the automatic adjustment tab screen D1. The rows included in the table E1 have a one-to-one correspondence with the frames included in the selected frame group that is to be the target of the position adjustment processing. The table E1 is a list having a "target frame" column and a "reference group" column, and the frame ID (name) of the corresponding frame is displayed in the "target frame" column, and the group ID (name) of the frame group to which the corresponding frame belongs is displayed in the "reference group" column. Accordingly, the "reference group" column is empty in a state where the corresponding frame is not included in any frame group. Note that a group database 53 that stores data similar to that in the table E1 is defined in the software management area 50, and the table E1 is created by referencing the group DB 53.

Figure 6:
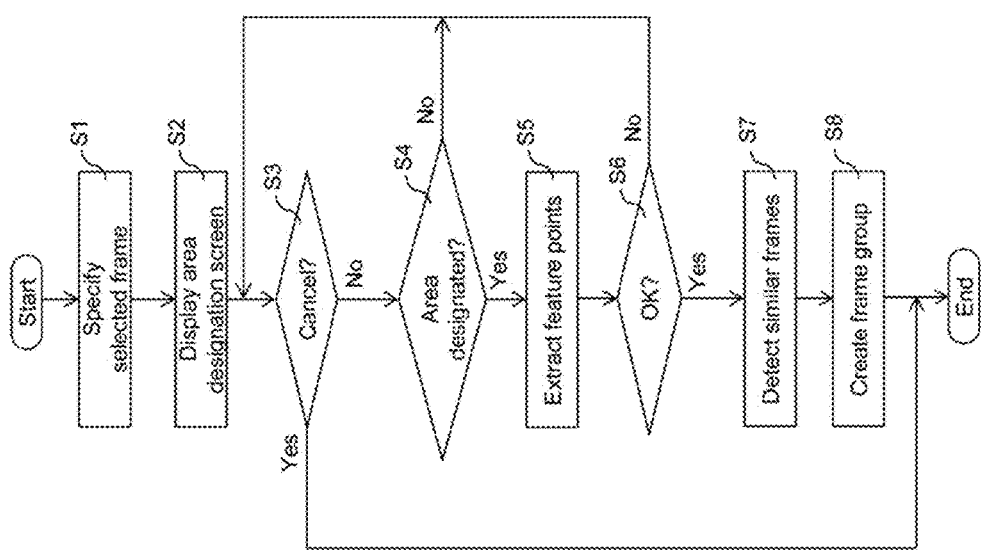
FIG. 6 is a flowchart showing a flow of automatic adjustment.

If the user presses the batch adjustment button E2 in a state where any one row included in the table E1 has been selected using an operation such as a click, it is detected by the automatic adjustment unit 42 and the automatic adjustment shown in FIG. 6 starts. First, in step S1, the automatic adjustment unit 42 specifies the frame corresponding to the row selected in the table E1 at the time when the batch adjustment button E2 was pressed (referred to as the selected frame in the description of automatic adjustment below). Next, in step S2, the position adjustment window W3 and a screen D4 (see FIG. 7) displaying the selected frame that was specified in step S1 are displayed in an overlapping manner on the basic screen W1 by the display control unit 45. The screen D4 is a screen for receiving from the user the designation of an area where the target object that is to be the reference for performing position adjustment is present in the selected frame.

Figure 7:
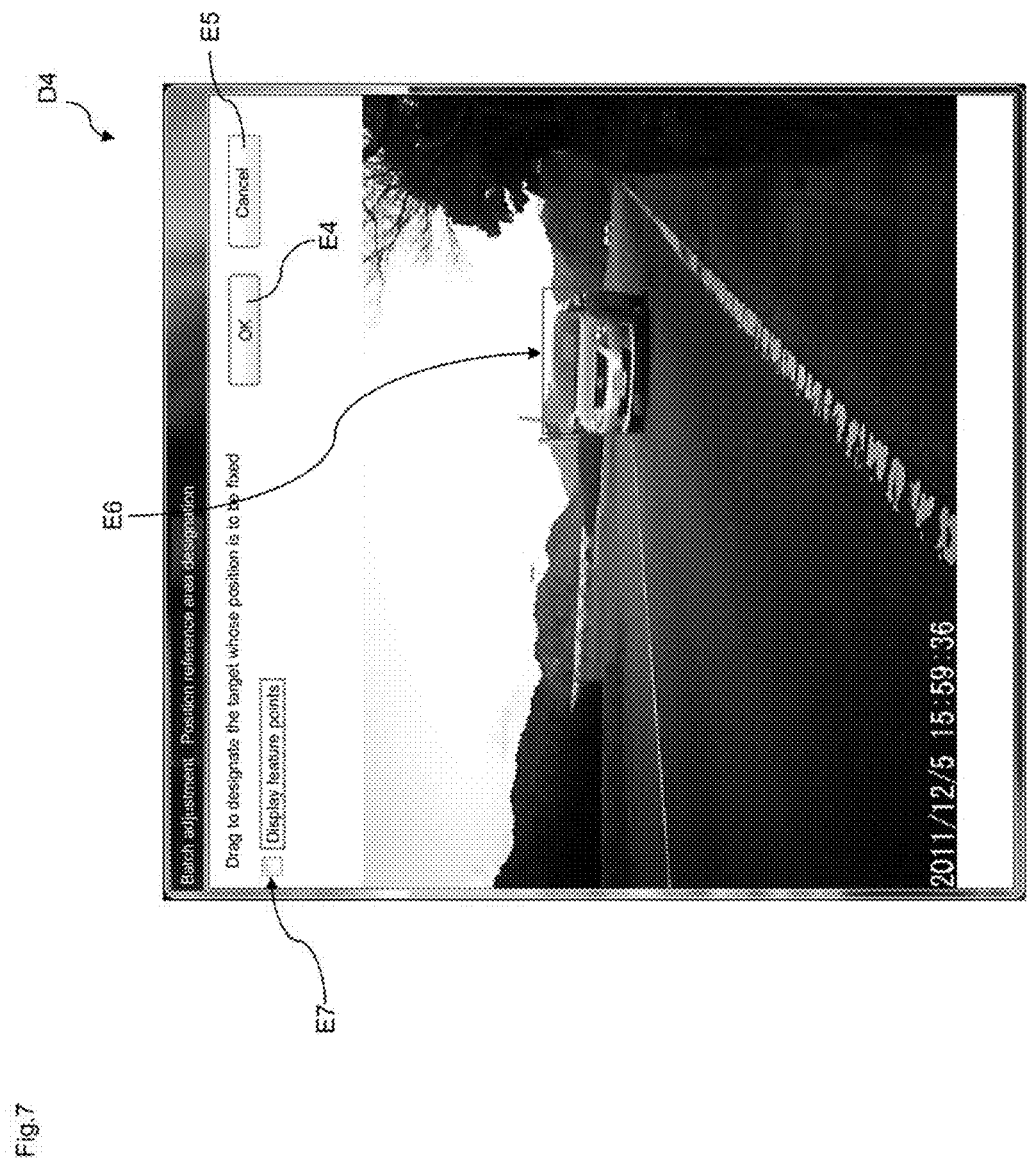
FIG. 7 is a diagram showing an area designation screen.

When the user designates (or re-designates) any area in the selected frame using an operation of a mouse or the like in the screen D4, it is detected by the automatic adjustment unit 42, and the procedure moves to the processing of step S5 ("YES" in step S4 after "NO" in step S3). Note that as shown in FIG. 7, a box E6 indicating the area designated by the user is displayed in the selected frame in the screen D4.

Figure 8:
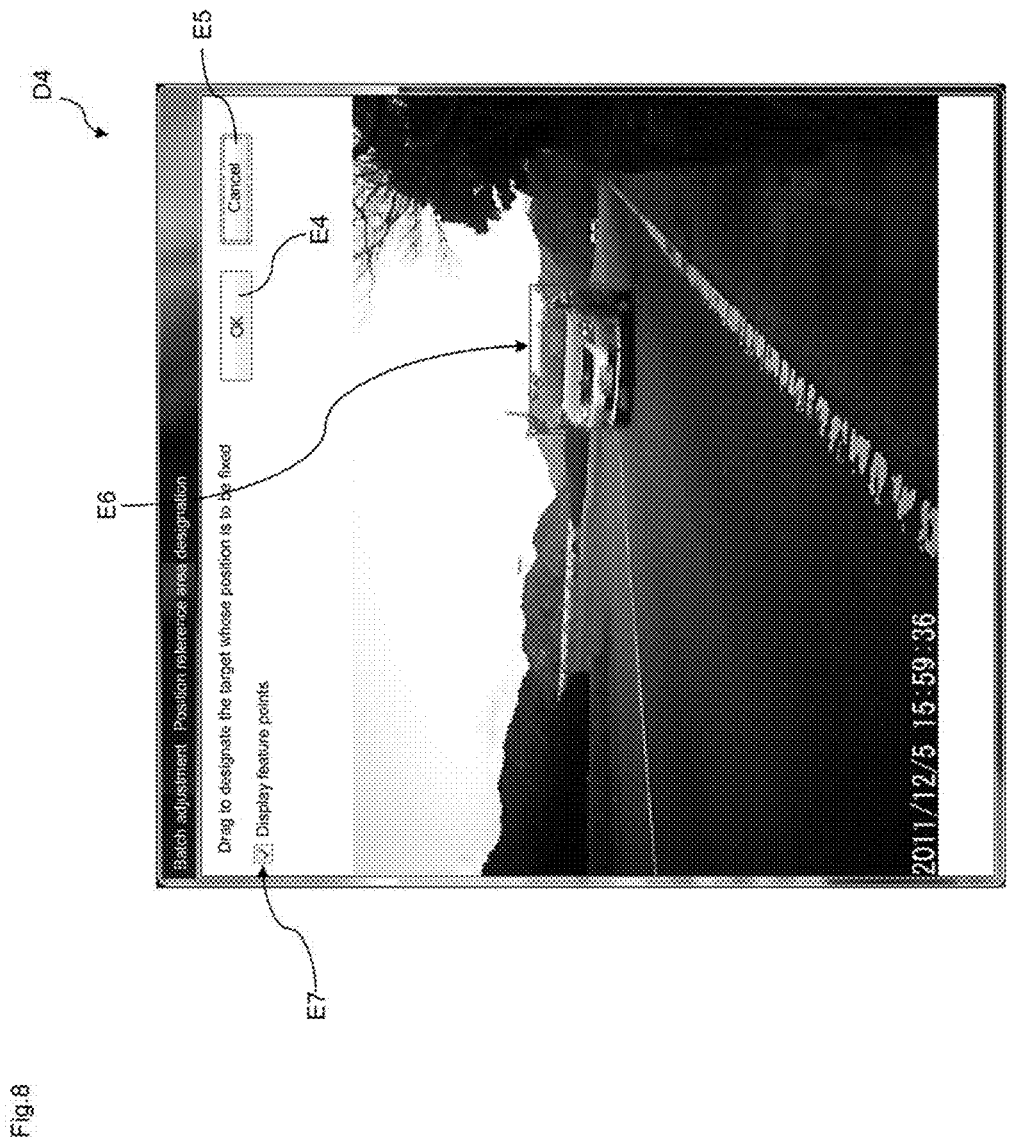
FIG. 8 is a diagram of the screen in FIG. 7 in a state where feature points are displayed.

In step S5, the automatic adjustment unit 42 extracts feature points in the area most recently designated by the user in the selected frame. Various types of feature points such as edges and intersections (corners) between edges are widely-known, and various algorithms for detecting them are widely-known as well, and therefore a detailed description thereof will not be included here. Note that as shown in FIG. 8, if the user places a check mark in a "display feature points" area E7 in the screen D4, after step S5 is executed, the feature points detected in step S5 are displayed in an emphasized manner in the box E6 in the screen D4. This makes it possible for the user to check whether or not the image processing apparatus 1 has correctly recognized the target object of interest.

If the user presses an OK button E4 in the screen D4 in the state where feature points have been detected in step S5, it is detected by the automatic adjustment unit 42 and the procedure moves to the processing of step S7 ("YES" in step S6). Also, although it is not shown in FIG. 6, the screen D4 is closed at this time. Note that the OK button E4 in the screen D4 is disabled in the state where no feature points have been detected, and thus cannot be pressed.

In step S7, from among the frames included in the selected frame group, the automatic adjustment unit 42 detects one or more frames having feature points that are the same as or similar to the feature points detected in step S5 (referred to as "similar frames" below). Note that the case where the feature points are the same or similar also includes the case where the arrangement patterns of the feature points are the same or similar. Also, the frames in the selected frame group that are to be the targets of scanning for detecting these similar frames can be selected as appropriate by a person skilled in the art. For example, among all of the frames included in the selected frame group, it is possible to scan only frames that are not included in any frame group, it is possible to scan all frames included in the selected frame group using a round-robin method, and it is possible to scan the selected frame group in accordance with another rule. Also, among the frames included in the selected frame group, locations where similar frames are thought to be present can be predicted to a certain extent. Accordingly, it is possible to use only frame groups in locations where similar frames are very likely to be present as the targets of scanning here. For example, similar frames are generally more likely to be detected the closer they are to the selected frame, and less likely to be detected the further they are from the selected frame. Accordingly, in the process of scanning the frames included in the selected frame group forward and backward along the timeline starting from the selected frame, if similar frames do not appear in the same direction for a predetermined number of frames or more in succession, scanning may be ended at that point in time.

In step S8 following step S7, the automatic adjustment unit 42 creates a frame group using the selected frame and all of the similar frames detected in step S7 as elements, and using the selected frame as the representative frame. Specifically, in the group DB 53, the automatic adjustment unit 42 stores information associating the frame IDs (names) of the selected frame and all of the similar frames with the group ID (name) of the frame group in the group DB 53. Note that the frame ID of the representative frame is used as the group ID of the frame group. Accordingly, if the information stored in the group DB 53 is referenced thereafter, it will be understood that the representative frame and all of the similar frames belong to the frame group specified by the frame ID of the representative frame. Accordingly, the processing for storing this information can be said to be processing for associating the selected frame and all of the similar frames with each other as members of the same frame group.

Here, the selected frame and all of the similar frames that were detected in step S7 are of a frame group that has the same or similar feature points, and therefore it is possible to perform position adjustment such that the feature points overlap. In step S8, the automatic adjustment unit 42 calculates the position adjustment amount for adjusting the positions of the similar frames with respect to the selected frame such that the feature points of the similar frames detected in step S7 overlap most favorably. As a specific method, for example, a method is conceivable in which the distances between corresponding feature points in the similar frames and the selected frame are calculated with respect to each feature point, and the positions of the similar frames are derived such that the sum of the distances for all of the feature points is minimized. Here, a position database 54 that stores the position adjustment amount of each frame included in the selected frame group is defined in the software management area 50. The automatic adjustment unit 42 stores the similar frame position adjustment amounts that were calculated here in the position DB 54.

During the execution of steps S7 and S8, a dialogue box displaying the progress status of steps S7 and S8 is displayed instead of the screen D4, which is closed before the start of step S7. Then, when step S8 ends, the automatic adjustment shown in FIG. 6 ends. Note that, as is evident from FIG. 6, if a cancel button E5 is pressed in the screen D4 as well, the screen D4 is closed and the automatic adjustment in FIG. 6 ends. In that case, no frame group is created. Also, if no similar frame is detected in step S7, a message screen to that effect is displayed, step S8 is skipped, the screen D4 is closed, and the automatic adjustment in FIG. 6 ends, although this is not shown in FIG. 6.

Figure 9:
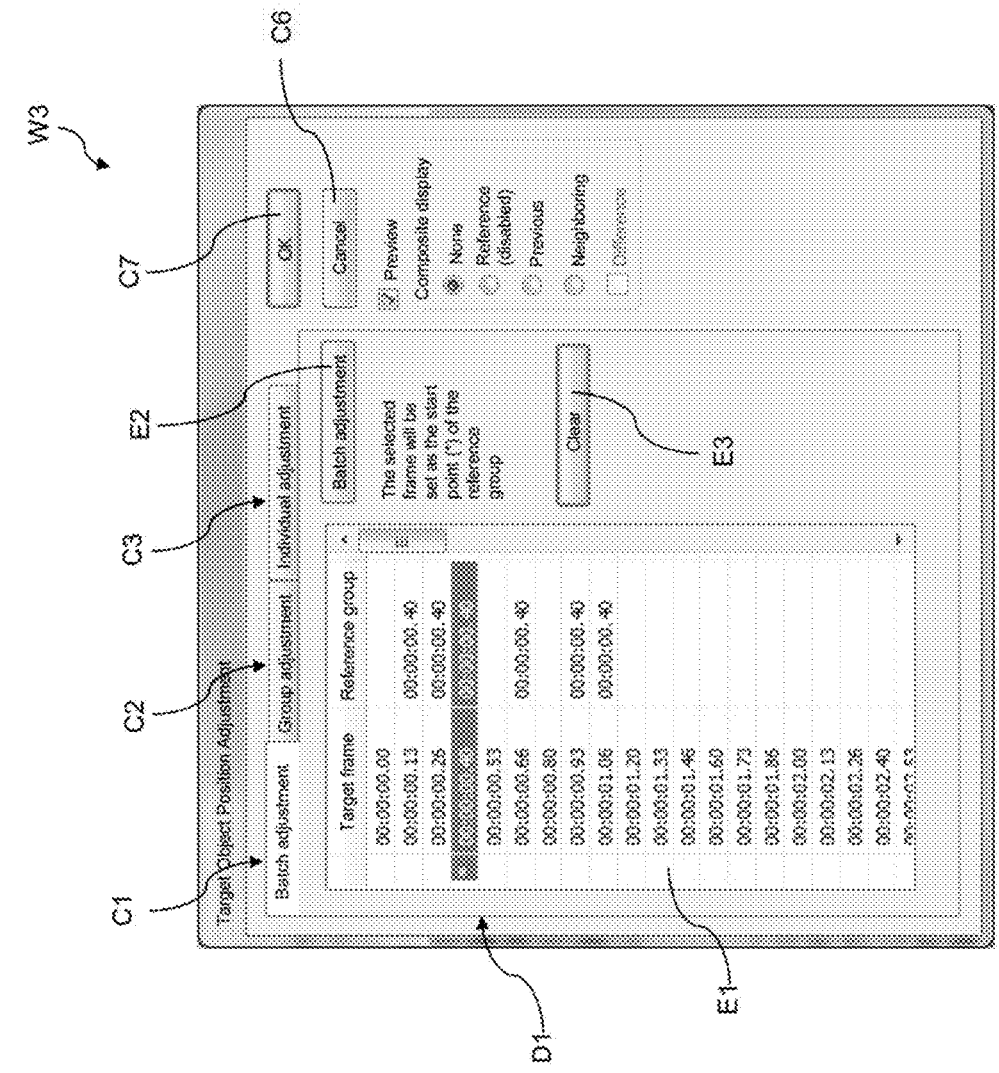
FIG. 9 is another diagram of a position adjustment window in a state where a tab for automatic adjustment has been selected.
Figure 10:
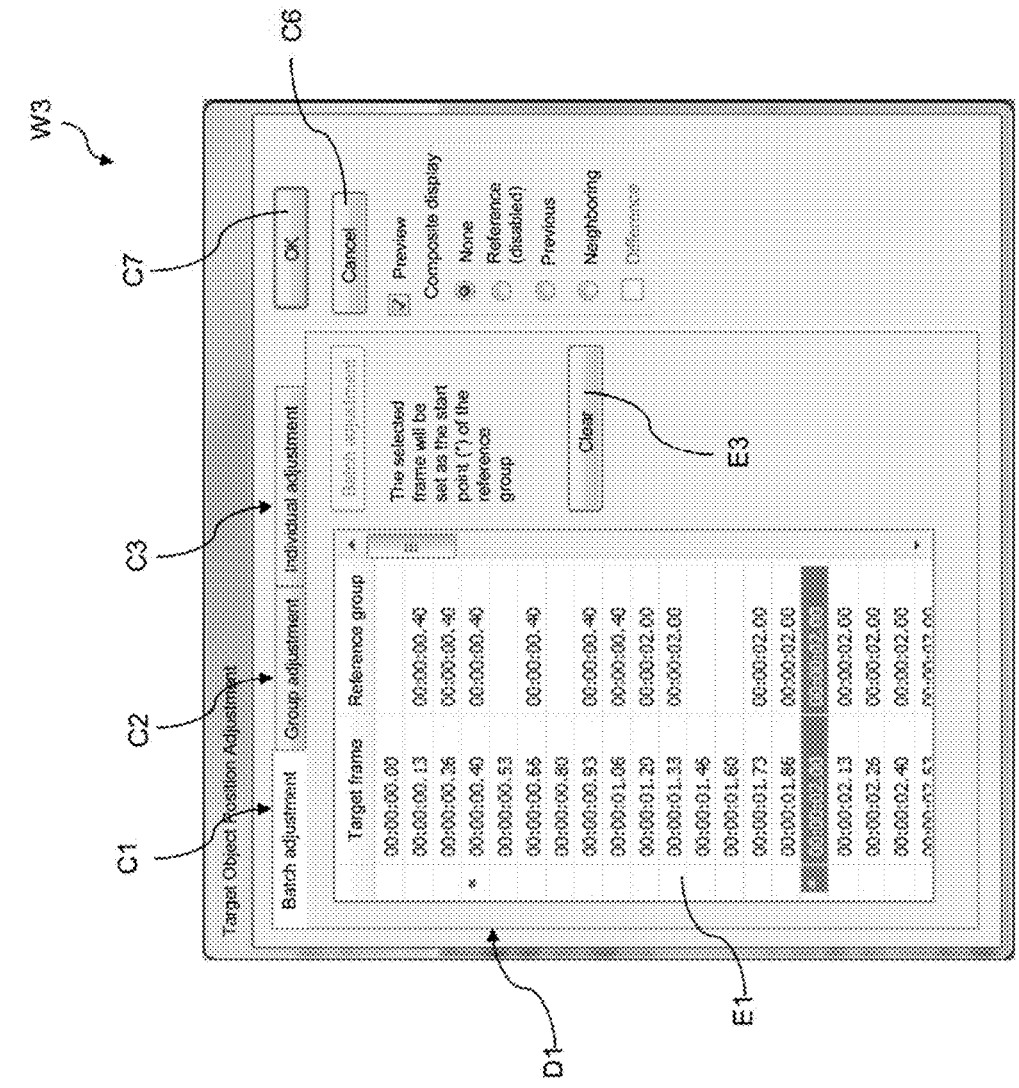
FIG. 10 is yet another diagram of a position adjustment window in a state where a tab for automatic adjustment has been selected.

If a frame group is successfully created and the processing in FIG. 6 ends, the processing result is reflected in the automatic adjustment tab screen D1 (see FIG. 9). Taking FIG. 9 as an example, it is clear that the six frames having "00:00:00.40" displayed in the "reference group" column have been included in the frame group whose group ID (name) is "00:00:00.40". FIG. 10 shows the tab screen D1 after the frame groups "00:00:00.40" and "00:00:02.00" have been created. Note that, as is clear from the description above, although element frames in principle do not belong to more than one group, there are cases where only a representative frame belongs to more than one group.

Also, the clear button E3 on the position adjustment window W3 is a button for canceling the effect of the position adjustment performed using the above-described processing. Specifically, for the selected frame at the time when the user has pressed the clear button E3, the automatic adjustment unit 42 returns the position adjustment amount to its default value (the value in the state where no position adjustment has been performed) and updates the values in the group DB 53 and the position DB 54 such that the selected frame is not included in any group. Also, if the clear button E3 is pressed in a state in which the representative frame has been selected, the automatic adjustment unit 42 performs similar processing on all of the frames belonging to the frame group that corresponds to the representative frame.

2-3-1-2. Group Adjustment

Group adjustment will be described next. As described above, group adjustment is processing for adjusting the positions of frames in units of frame groups in a uniform manner such that the relative positions between all of the frames included in the same frame group are maintained. Group adjustment is executed via the tab screen D2 displayed in the position adjustment window W3 (see FIG. 11).

Figure 11:
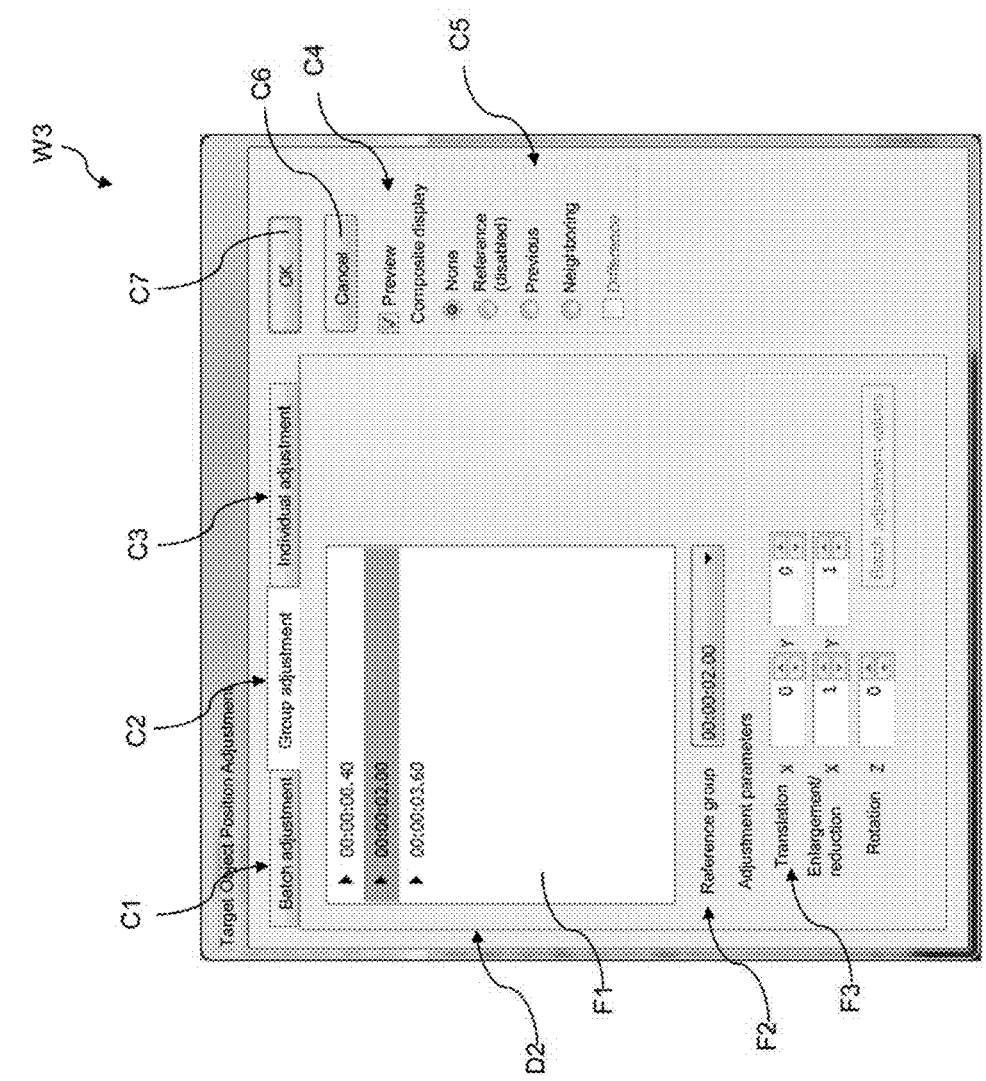
FIG. 11 is a diagram of a position adjustment window in a state where a tab for group adjustment has been selected.

As shown in FIG. 11, a list F1 of frame groups that have been registered in the group DB 53 is arranged in the tab screen D2. Here, a case is shown in which three frame groups, namely "00:00:00.40", "00:00:02.00", and "00:00:03.60" have been created. From among the frame groups registered in the group DB 53, the user designates an arbitrary frame group that is to be the target of executing group position adjustment via the list F1, and the group adjustment unit 43 receives this designation. A reference group area F2 and a group adjustment amount area F3 are also arranged in the tab screen D2.

Figure 12:
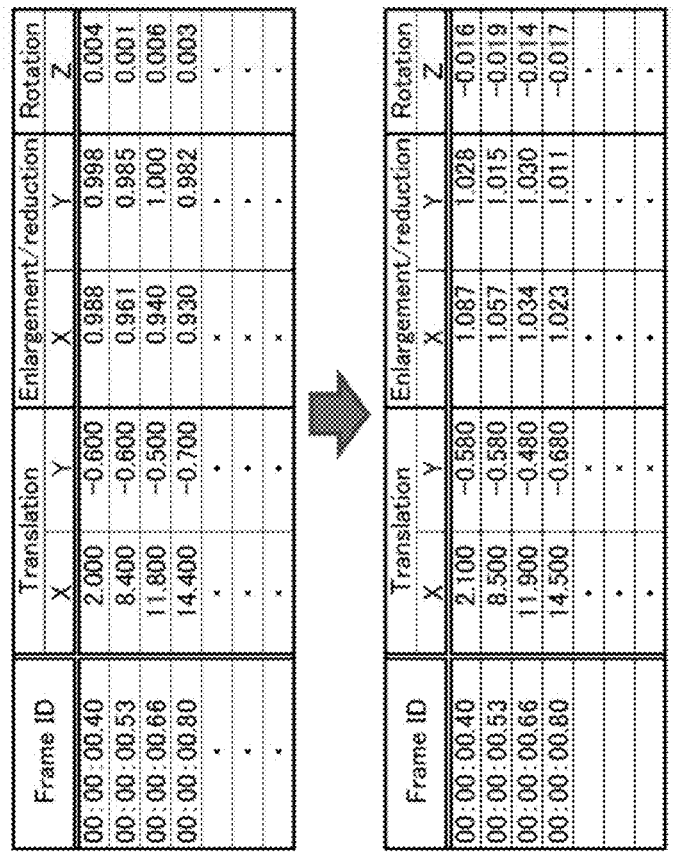
FIG. 12 is a diagram showing a position database before and after group adjustment is performed.

The group adjustment unit 43 receives from the user a designation of a position adjustment amount (referred to as a "group adjustment amount" below) for the frame group that is currently selected (referred to as the "selected group" below) in the list F1 via the group adjustment amount area F3. Specifically, the position adjustment amount of the representative frame of the selected group is displayed in the group adjustment amount area F3, and the user can change that value as appropriate by performing a predetermined operation via the input unit 20. Upon detecting that the user has changed the position adjustment amount of the representative frame of the selected group via the group adjustment amount area F3, the group adjustment unit 43 reflects the content of the change in the value of the position adjustment amount in the position DB 54. More specifically, the group adjustment unit 43 detects the change amount for the position adjustment amount of the representative frame of the selected group that was designated by the user, and uniformly changes the position adjustment amounts of all of the frames belonging to the selected group by the change amount in the position DB 54. For example, if the change amounts of the representative frame of the selected group with respect to the translation amount in the X axis and Y axis directions, the rotation amount around the Z axis, and the enlargement and reduction amounts in the X axis and Y axis directions are 0.100, 0.020, 1.100, 1.030, and −0.020 respectively, the state shown in the upper portion of FIG. 12 will become the state shown in the lower portion of FIG. 12. Note that "00:00:00.40" is the representative frame, and "00:00:00.53", "00:00:00.66", and "00:00:00.80" are frames belonging to the same frame group as "00:00:00.40". As a result, the relative positions between all frames included in the selected frame group are maintained in group adjustment.

Note that in the present embodiment, the position adjustment amounts of the frames stored in the position DB 54 are position adjustment amounts that are relative to the state in which those frames have not undergone any position adjustment. In this sense, the position adjustment amounts of the frames stored in the position DB 54 in the present embodiment are absolute position adjustment amounts, and are not position adjustment amounts that are relative to other frames such as the representative frame of the frame group to which that frame belongs. However, in another embodiment, information for specifying a reference frame such as the representative frame and relative position adjustment amounts with respect to the reference frame may be stored, and the absolute position adjustment amounts may be calculated based on the position adjustment amount of the reference frame as necessary. In that case, if a frame that is to be a reference is furthermore associated with a frame that is to be a reference, the absolute position adjustment amounts can be calculated by sequentially calculating the relative position adjustment amounts between frames that are in a parent-child relationship.

Figure 13:
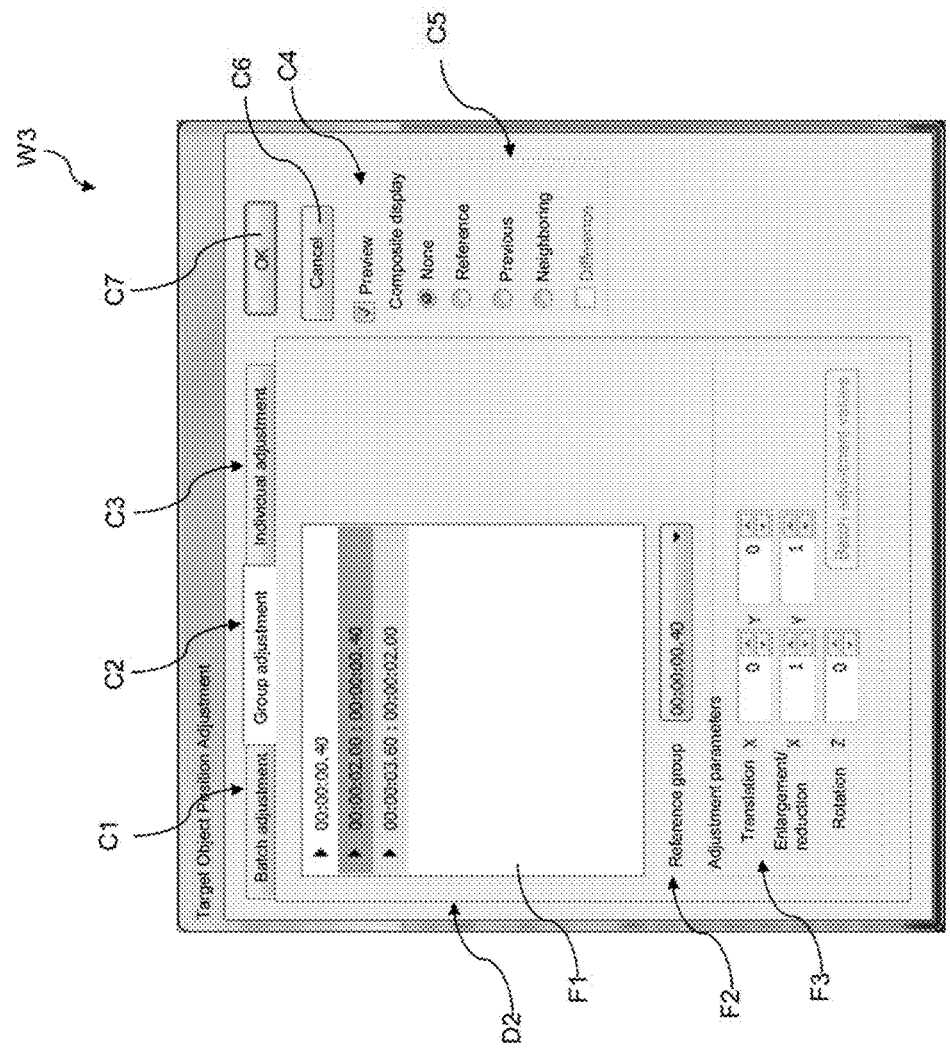
FIG. 13 is another diagram of a position adjustment window in a state where a tab for group adjustment has been selected.

Also, from among the frame groups registered in the group DB 53, the user designates any frame group with respect to the selected group via the reference group area F2, and the group adjustment unit 43 receives this designation. The frame group designated here is the frame group that is to be the reference for the selected group (referred to as the "reference group" below). The setting of the reference group for the selected group (which will be described in detail later) is useful for performing position adjustment on a certain frame group (the selected group) with respect to another frame group (the reference group). Note that it is also possible to select the selected group itself as the reference group. Also, the default reference group for a frame group is the frame group itself. Note that as shown in FIG. 13, when a reference group is selected for the selected group, the group ID of the reference group is displayed on the right side in the list F1 in association with the group ID of the selected group. Also, the information of the reference group that is set here is managed in the group DB 53. Specifically, the frame ID of the representative frame of the reference group is stored in the "reference group" column of the row corresponding to the representative frame of the selected group. Here, the information in the group DB 53 is linked with the display of the above-described table E1. Accordingly, in the above description, it was described that the group ID of the frame group to which the corresponding frame belongs (i.e., the frame ID of the representative frame) is displayed in the "reference group" column in the table E1, but if a reference group has been selected for the representative frame, the frame ID of the representative frame of the reference group is stored in the "reference group" column of the row corresponding to the representative frame rather than using the frame ID of the representative frame of the frame group to which the corresponding frame belongs.

As shown in FIG. 13, a preview selection area C4 and a composite designation area C5 are arranged along with the tab screen D2 in the position adjustment window W3. Here, while the tab screen D2 is displayed, the representative frame of the selected group is displayed in the active display window W2 that is displayed at the same time as the tab screen D2. The preview selection area C4 receives a selection from the user as to whether the representative frame of the selected group displayed in the active display window W2 is to be an image in a state in which no position adjustment has been performed, or an image resulting from all previous position adjustment. Here, the amount of all previous position adjustment is expressed using the absolute position adjustment amount stored in the position DB 54. Then, if the user has placed a check mark in the preview selection area C4, the display control unit 45 causes the representative frame of the selected group resulting from all previous position adjustment (referred to as the "post-adjustment representative frame" below) to be displayed as a preview in the active display window W2. The user can easily determine the appropriate group adjustment amount by referencing the post-adjustment representative frame being displayed in the active display window W2.

The composite designation area C5 is an area that is enabled only when a check mark has been placed in the preview selection area C4. The area C5 receives a selection from the user as to whether or not the post-adjustment representative frame that is to be displayed as a preview in the active display window W2 is to be a composite image including another image, and if it is to be a composite image, the area C5 receives a selection from the user as to what kind of image the post-adjustment representative frame is to be composited with in the composite image. Here, if "none" has been selected in the composite designation area C5, the display control unit 45 displays the post-adjustment representative image as-is in the active display window W2. On the other hand, if "reference" has been selected, a composite image of the post-adjustment reference frame and the representative frame of the reference group for the selected group resulting from all previous position adjustment (comparison frame) is displayed. Note that if no reference group has been set for the selected group, the word "(disabled)" is displayed next to the word "reference" in the composite designation area C5 (see FIG. 11), and the post-adjustment representative frame is displayed as-is in the active display window W2. Also, if "previous" has been selected in the composite designation area C5, a composite image of the post-adjustment representative frame and the result of all previous position adjustment performed on a predetermined number of frames immediately prior to the representative frame of the selected group on the active timeline (comparison frame) is displayed. Also, if "neighboring" has been selected in the composite designation area C5, a composite image of the post-adjustment representative frame and the result of all previous position adjustment performed on a predetermined number of frames around (before/after) the representative frame of the selected group on the active timeline (comparison frame) is displayed.

Here, the composite image in the present embodiment is an average image or a difference image. An average image is an image obtained by making the post-adjustment representative frame translucent and overlaying it on the comparison frame. On the other hand, the difference image is an image in which only the differences between the representative frame and the comparison frame are shown. Accordingly, the user viewing this composite image can intuitively understand the shift in the positions of the images. The composite designation area C5 receives a selection from the user as to whether to display the average image or the difference image as a preview. If a check mark has been placed in "difference" in the composite designation area C5, the display control unit 45 displays the difference image of the comparison frame and the post-adjustment representative frame, and if no check mark has been placed, the display control unit 45 displays the average image.

According to the group adjustment function described above, the user can easily perform position adjustment between multiple frame groups. That is to say that the user first sets the parent-child relationship between the multiple frame groups displayed in the list F1. The parent-child relationship mentioned here is a setting relationship for the reference group between frame groups, and if a certain frame group is a child group, the reference group for that child group is the parent group. Needless to say, the user may set a grandchild group, a great-grandchild group, or a sibling group in the parent-child relationship mentioned here. Then, the user selects "preview" and "reference" in the areas C4 and C5, thereby causing the composite image of the post-adjustment representative frame and the representative frame of the reference group resulting from all previous position adjustment to be displayed as a preview in the active display window W2. If the average image is being displayed, the group adjustment amount is determined such that the images of the target object of interest (the images originating from the post-adjustment representative frame and the comparison frame) overlap favorably in the average image, and the result is input to the group adjustment amount area F3. On the other hand, if the difference image is being displayed, the group adjustment amount is determined such that the target object of interest is not visible in the difference image, and the result is input to the group adjustment amount area F3. Note that each time the user designates a change in the group adjustment amount, the position adjustment amount in the position DB 54 is updated in real time, and at the same time, the composite image displayed as a preview in the active display window W2 is also updated in real time to a composite image that is based on the most recent position adjustment amount. Accordingly, while trying various group adjustment amounts and visually checking the effects, the user can ultimately obtain an appropriate group adjustment amount by which the target objects of interest overlap most favorably in the average image, or by which the target objects of interest are the least visible in the difference image.

Note that at the time when a frame group is created by the automatic adjustment, the relative positions between all of the frames belonging to the frame group are known. Accordingly, thereafter, if the relative positions of frames selected at least one frame at a time from different frame groups are known, the relative positions between all of the frames belonging to the frame groups are known as well. Accordingly, during group adjustment, the user manually adjusts the position of the representative frame of the selected group with respect to the representative frame of the reference group, and thereby all of the frames belonging to both groups undergo position adjustment with respect to one another.

Also, in the present embodiment, in the case where a parent-child relationship has been set between multiple frame groups, if an ancestor frame group undergoes position adjustment using group adjustment, all of the descendant frame groups undergo position adjustment as well. That is to say that each time the group adjustment amount for the selected group is changed in the group adjustment amount area F3, the group adjustment unit 43 detects the change amount and uniformly changes not only the position adjustment amounts of all of the frames belonging to the selected group, but also the position adjustment amounts of all of the frames belonging to the descendant groups of the selected group according to the change amount in the position DB 54. As a result, the relative positions between all frames included in the selected frame group and the descendant groups are maintained in group adjustment.

2-3-1-3. Individual Adjustment

Next, individual adjustment will be described. As described above, individual adjustment is processing for individually adjusting the position of any frame included in the selected frame group. That is to say that unlike with group adjustment, the position adjustment of a specific frame is not linked to the position adjustment of other frames. Individual adjustment is executed via the tab screen D3 displayed in the position adjustment window W3 (see FIG. 14).

Figure 14:
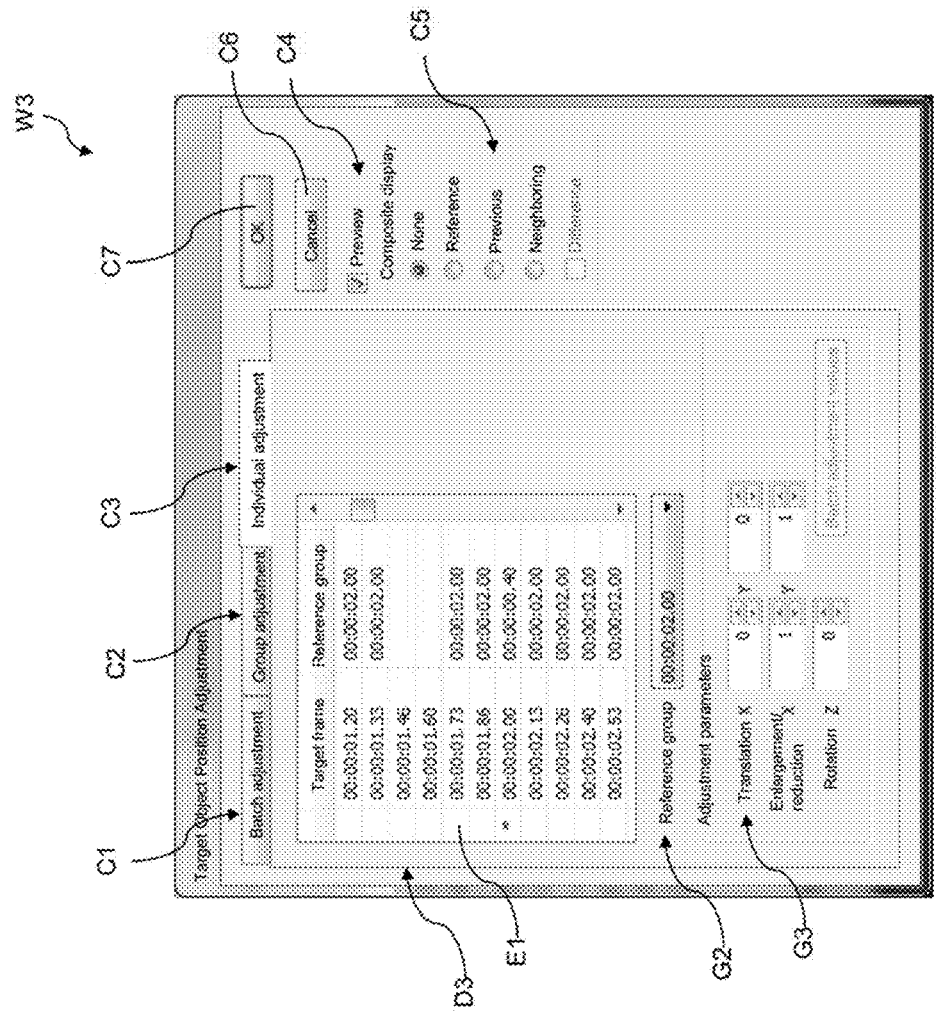
FIG. 14 is a diagram of a position adjustment window in a state where a tab for individual adjustment has been selected.

As shown in FIG. 14, the table E1 is displayed in the tab screen D3, similarly to the case of the tab screen D1. The designation of an arbitrary frame in the selected frame group that is to be the target of executing the individual position adjustment is received by the individual adjustment unit 44 from the user via the table E1. Also, a group area G2 and an individual position adjustment area G3 are arranged in the tab screen D3 as well.

The individual adjustment unit 44 receives from the user the designation of the position adjustment amount (referred to below as the "individual adjustment amount") of the frame that is currently selected by the user (referred to as the "selected frame" in the description of individual adjustment below) in the table E1 via the individual adjustment amount area G3. Specifically, the position adjustment amount of the selected frame is displayed in the individual adjustment amount area G3, and the user can change the value as appropriate by performing a predetermined operation via the input unit 20. Upon detecting that the user has changed the position adjustment amount of the selected frame via the individual adjustment amount area G3, the individual adjustment unit 44 reflects the content of the change in the value of the position adjustment amount in the position DB 54.

More specifically, the individual adjustment unit 44 detects the change amount in the position adjustment amount of the selected frame designated by the user and individually changes the position adjustment amount of the selected frame by the change amount in the position DB 54. As a result, with individual adjustment, if the selected frame is included in a frame group, the relative positions of the selected frame and the other frames included in the frame group change.

Also, the individual adjustment unit 44 receives from the user the designation of an arbitrary frame group from among the frame groups registered in the group DB 53 with respect to the selected frame via the group area G2. The individual adjustment unit 44 includes the selected frame in the frame group designated here. Accordingly, if a frame has not been included in any frame group by the automatic adjustment, it can be forcibly included in a frame group. It is also possible to re-set the frame group for a frame that has already been included in a frame group using automatic adjustment. Also, the designation of the frame group via the group area G2 (including re-setting. The same follows below.) is useful for adjusting the position of a certain frame (the selected frame) with respect to another frame (the representative frame of the reference group), and this will be described in detail later.

Also, the information regarding the frame group designated here is managed in the group DB 53. Specifically, the group ID of the frame group designated here (i.e., the frame ID of the representative frame) is stored in the "reference group" column in the row corresponding to the selected frame. In other words, information associating the frame ID of the selected frame with the group ID of the frame group designated here is stored in the group DB 53 by the individual adjustment unit 44. Also, each time the user designates a frame group via the group area G2, the information regarding the frame group that is managed in the group DB 53 is updated in real time, and at the same time, the group ID in the "reference group" column that is displayed on the right side of the frame ID of the selected frame in the table E1 is also updated.

While the tab screen D3 is being displayed, the selected frame is displayed in the active display window W2 that is displayed at the same time as the tab screen D3. Also, as shown in FIG. 14, the preview selection area C4 and the composite designation area C5, which are similar to those described above, are arranged along with the tab screen D3 in the position adjustment window W3. Accordingly, even at the time of performing individual adjustment, a preview of the selected frame can be displayed in a variety of modes in the active display window W2. By simply replacing the selected frame with the representative frame of the selected group, the mode of displaying the selected frame at the time of individual adjustment is the same as that at the time of group adjustment, and therefore a detailed description thereof will not be repeated here. Note that the representative frame of the reference group for generating the composite image is the frame displayed in the "reference group" column of the row corresponding to the selected frame in the table E1 (referred to as the "parent frame" below).

Accordingly, the above-described individual adjustment function enables the user to easily adjust the position of an arbitrary frame included in the selected group with respect to the reference frame of any frame group, or an immediately previous or neighboring frame on the same timeline. In other words, the user first selects various options in the areas C4 and C5, and thereby causes various composite images to be displayed as previews in the active display window W2.

Then, while viewing the preview screen, the user finds a frame whose position adjustment has not been performed favorably, selects it as the selected frame, and furthermore determines the frame (a representative frame, or an immediately previous or neighboring frame on the same timeline) with respect to which the selected frame is to undergo position adjustment. At this time, if it is determined that a representative frame is to be used as the reference in the position adjustment, the reference frame is associated with the selected frame via the group area G2 as necessary. In addition, the user determines the appropriate individual adjustment amount while viewing various composite images in the active display window W2 and inputs the amount in the individual adjustment amount area G3. Note that each time the user designates a change in the individual adjustment amount, the position adjustment amount of the selected frame in the position DB 54 is updated in real time, and at the same time, the preview screen in the active display window W2 is also updated in real time to a preview screen that is based on the most recent position adjustment amount. Accordingly, while trying various individual adjustment amounts and visually checking the effects, the user can ultimately obtain the most favorable individual adjustment amount by which the target objects of interest overlap most favorably in the average image or are the least visible in the difference image.

Here, the play button T2, the frame advance button T3, the frame reverse button T4, and the timeline bar T5 on the basic screen W1 can receive operations from the user while the position adjustment processing is being executed as well. Also, if a check mark has been placed in the preview selection area C4, the display control unit 45 can cause an arbitrary frame that is included in the selected frame group and has undergone all previous position adjustment to be displayed as a preview in the active display window W2, upon receiving the appropriate operations on the objects T2 to T5 from the user. At this time, the display control unit 45 can also playback frames belonging to any section of the active timeline as a video that has undergone all previous position adjustment. This function is useful for easily finding frames that have not undergone position adjustment favorably. Also, if this function is used, it is also possible to know the timing when the position adjustment of the selected frame group is complete and the position adjustment processing should end.

The position adjustment processing ends when the image processing unit 41 detects that the OK button C7 in the position adjustment window W3 has been pressed. At this time, for each frame included in the selected frame group, the image processing unit 41 stores the image that has undergone all previous position adjustment as an image with the coordinate m subsequent to that frame in the processed file area 52. On the other hand, upon detecting that the cancel button C6 in the position adjustment window W3 has been pressed, the image processing unit 41 discards the images for the frames included in the selected frame group that have undergone all previous position adjustment and ends the position adjustment processing without changing the coordinate m of the corresponding frames.

Note that after the position adjustment processing has ended, the information in the group DB 53 and the position DB 54 may be left in the software management area 50 or deleted.

3. Application

After the position adjustment processing has ended, various operations on the objects T2 to T5 in the basic screen W1 are received from the user, and the display control unit 45 can play back the frame group that has undergone position adjustment according to the present processing as still images or as a video in the active display window W2. Here, during position adjustment processing, if a still object such as a building has been selected as the target object that is to be the reference for the position adjustment in the video, camera blurring (also known as "camera-shake") will be corrected in the ultimately obtained video that has undergone position adjustment. On the other hand, if a moving body such as a person or a car that moves within the screen has been selected as this kind of target object, a video will be obtained in which it appears that the moving body is still and still objects that are actually still are moving. Also, in the latter case, if a person moving around in the screen is captured, after performing position adjustment, a video will be obtained in which that same person is stepping in place.

The image processing program 2 can handle image processing with respect to various types of video, and for example, it can be used in the field of analyzing surveillance video from a security camera in order for an organization such as the police to investigate an incident. For example, there are cases where a suspect is captured on the surveillance video of the security camera. In such a case, if the above-described position adjustment is executed using the suspect as the target object, the user does not need to follow the suspect with his or her eyes in various locations on the screen, and it is easier for the user to observe the actions of the suspect in the video obtained as a result of the position adjustment. Also, depending on the case, due to the residual image effect, it is possible to notice actions that could not be noticed due to the suspect moving around in the screen.

4. Variations

Although an embodiment of the present invention has been described above, the present invention is not limited to the above-described embodiment, and various modifications are possible within a scope that does not deviate from the gist of the invention. For example, the following modifications are possible.

4-1

The types of parameters for the position adjustment amount can be selected as appropriate by a person skilled in the art, and, for example, position adjustment can be performed using distortion in place of or in addition to the above-described translation, rotation, enlargement, and reduction.

4-2

The comparison frame for creating the composite image in group adjustment and individual adjustment is not limited to the description above, and, for example, it is possible to allow the user to manually select the comparison frame freely out of the selected frame group.

4-3

In the above-described embodiment, the position adjustment of the ancestor frame group is linked to the position adjustment of the descendant frame group. However, this type of link is not limited to being set between frame groups, and the parent-child relationship setting may be received between a frame and a frame group, or between frames as well, and it is possible to link the position adjustment between these combinations.

4-4

In the above-described embodiment, the user manually designates the area in which the target object that is to be the reference for position adjustment is present in the selected frame during automatic adjustment. However, it is possible for the target object that is to be the reference for the position adjustment to be automatically calculated in the selected frame without receiving the designation of the area by the user. As an example of this type of calculation method, a method is conceivable in which a moving body in the selected frame or the background of the selected frame is automatically detected and used as the reference for the position adjustment. Note that as the method for automatically detecting the moving body in the selected frame or the background of the selected frame, a method is conceivable in which an average image (i.e., a background image) is created for a frame group around the selected frame on the timeline and compared with the selected frame.

The invention claimed is:

1. An image processing apparatus configured to perform position adjustment between a plurality of frames included in a video such that images of a target object captured in the video overlap one another, the image processing apparatus comprising:

a group creation unit configured to automatically create a plurality of frame groups, each frame group including a plurality of frames that are a portion of the video and have undergone position adjustment with respect to one another such that the target object images overlap one another, and the group creation unit configured to further store in a non-volatile storage unit, for each frame group, a group ID of that frame group and frame IDs of all the frames included in that frame group with the frame IDs and the group ID are being associated with each other; and a group adjustment unit configured to receive, from a user, a designation of a user-selected group that is a specific frame group included in the plurality of the frame groups, each of which has been automatically created by the group creation unit and includes a plurality of frames that have undergone position adjustment with respect to one another, a designation of a group adjustment amount that is a position adjustment amount for the user-selected group, and a designation of a single comparison frame that is included in the video, but is not included in the designated user-selected group, and perform position adjustment on all the frames included in the user-selected group in accordance with the group adjustment amount without performing position adjustment on frames included in the video, but not included in the user-selected group, the group adjustment amount being associated with at least one of translation, rotation, and distortion of the plurality of frames included in the user-selected group, wherein the group adjustment unit is configured to, each time receiving the designation of the group adjustment amount from the user, display a composite image of the single comparison frame and a representative frame that is included in the user-selected group and has undergone the position adjustment in accordance with the received group adjustment amount, such that the user can reference the composite image when the group adjustment amount is designated, the composite image being an image in which the comparison frame is overlapped on the representative frame and being displayed at the same time along with a graphical user interface allowing the user to input the group adjustment amount.

2. The image processing apparatus according to claim 1, further comprising:

an individual adjustment unit configured to receive, from the user, a designation of an individual adjustment amount that is a position adjustment amount for a specific frame included in the video, and perform individual position adjustment on the specific frame in accordance with the individual adjustment amount.

3. The image processing apparatus according to claim 2, wherein the group adjustment unit is configured to allow the user to designate a reference frame included in the video in association with the frame group, and when the reference frame undergoes position adjustment by a specified position adjustment amount, automatically perform position adjustment on the plurality of frames included in the frame group by the specified position adjustment amount.

4. The image processing apparatus according to claim 2, wherein the group creation unit is configured to allow the user to designate an area in which the target object is present in a specific frame included in the video, detect a feature point in the designated area, detect, in the entirety or a portion of the video, a frame having a feature point that is the same as or similar to the detected feature point, and associate the specific frame and the detected frame as belonging to the same frame group.

5. The image processing apparatus according to claim 2, further comprising:

a display control unit configured to sequentially play back the plurality of frames included in the video that are the result of the position adjustment.

6. The image processing apparatus according to claim 2, wherein the position adjustment further includes performing a least one of enlargement and reduction of the frame.

7. The image processing apparatus according to claim 1, wherein the group adjustment unit is configured to allow the user to designate a reference frame included in the video in association with the frame group, and when the reference frame undergoes position adjustment by a specified position adjustment amount, automatically perform position adjustment on the plurality of frames included in the frame group by the specified position adjustment amount.

8. The image processing apparatus according to claim 7, further comprising:

a display control unit configured to sequentially play back the plurality of frames included in the video that are the result of the position adjustment.

9. The image processing apparatus according to claim 1, wherein the group creation unit is configured to allow the user to designate an area in which the target object is present in a specific frame included in the video, detect a feature point in the designated area, detect, in the entirety or a portion of the video, a frame having a feature point that is the same as or similar to the detected feature point, and associate the specific frame and the detected frame as belonging to the same frame group.

10. The image processing apparatus according to claim 1, further comprising:

a display control unit configured to sequentially play back the plurality of frames included in the video that are the result of the position adjustment.

11. The image processing apparatus according to claim 1, wherein the position adjustment further includes performing at least one of enlargement and reduction of the frame.

12. A non-transitory computer-readable medium storing an image processing program for performing position adjustment between a plurality of frames included in a video such that images of a target object captured in the video overlap one another, the program causing a computer to execute steps of:

automatically creating a plurality of frame groups, each frame group including a plurality of frames that are a portion of the video and have undergone position adjustment with respect to one another such that the target object images overlap one another, and storing in a non-volatile storage unit, for each frame group, a group ID of that frame group and frame IDs of all the frames included in that frame group with the frame IDs and the group ID are being associated with each other; and receiving, from a user, a designation of a user-selected group that is a specific frame group included in the plurality of the frame groups, each of which has been automatically created and includes a plurality of frames that have undergone position adjustment with respect to one another, a designation of a group adjustment amount that is a position adjustment amount for the user-selected group, and a designation of a single comparison frame that is included in the video, but is not included in the designated user-selected group, each time receiving the designation of the group adjustment amount from the user, displaying a composite image of the comparison frame and a representative frame that is included in the user-selected group and has undergone the position adjustment in accordance with the received group adjustment amount, such that the user can reference the composite image when the group adjustment amount is designated, the composite image being an image in which the comparison frame is overlapped on the representative frame and being displayed at the same time along with a graphical user interface allowing the user to input the group adjustment amount, and performing position adjustment on all the frames included in the user-selected group in accordance with the group adjustment amount without performing position adjustment on frames included in the video, but not included in the user-selected group, the group adjustment amount being associated with at least one of translation, rotation, and distortion of the plurality of frames included in the user-selected group.

13. The non-transitory computer-readable medium according to claim 12, further comprising:

receiving, from the user, a designation of an individual adjustment amount that is a position adjustment amount for a specific frame included in the video, and performing individual position adjustment on the specific frame in accordance with the individual adjustment amount.

* * * * *